United States Patent [19]

Abe

[11] Patent Number: 5,134,472
[45] Date of Patent: Jul. 28, 1992

[54] MOVING OBJECT DETECTION APPARATUS AND METHOD

[75] Inventor: Shozo Abe, Tokyo, Japan

[73] Assignee: Kabushiki Kaisha Toshiba, Japan

[21] Appl. No.: 476,323

[22] Filed: Feb. 7, 1990

[30] Foreign Application Priority Data

Feb. 8, 1989 [JP] Japan .................................. 1-029281
Feb. 16, 1989 [JP] Japan .................................. 1-036487

[51] Int. Cl.⁵ ...................... H04N 7/18; H04N 5/225; H04N 9/74
[52] U.S. Cl. .................................. 358/105; 358/108; 358/126; 358/22
[58] Field of Search ............... 358/105, 108, 126, 106, 358/22 PIP; 382/22

[56] References Cited

U.S. PATENT DOCUMENTS

| | | | |
|---|---|---|---|
| 4,694,329 | 9/1987 | Belmares-Sarabia | 358/105 |
| 4,736,252 | 4/1988 | Nakagawa | 358/105 |
| 4,737,847 | 4/1988 | Araki | 358/105 |
| 4,779,131 | 10/1988 | Matsumoto | 358/105 |
| 4,783,833 | 11/1988 | Kawabata | 358/105 |
| 4,884,136 | 11/1989 | Ninomiya | 358/105 |
| 4,908,704 | 3/1990 | Fujioka | 358/105 |
| 4,959,714 | 9/1990 | Lo | 358/125 |

Primary Examiner—John K. Peng
Assistant Examiner—Sherrie Hsia
Attorney, Agent, or Firm—Banner, Birch, McKie & Beckett

[57] ABSTRACT

A moving object detecting apparatus is disclosed and includes a TV camera for generating an image signal in accordance with a scene including a moving object and a fixed object. A CPU takes the difference, between the image signals generated by the TV camera at different times to generate a subtracted image signal. CPU then sets a pointing window over the subtracted image corresponding to the subtracted image signal which includes an image corresponding to the moving object. A CPU analyzes signals generated by the TV camera, within the pointing window, and detects an image area corresponding to the moving object.

29 Claims, 10 Drawing Sheets

MOVING OBJECT DETECTION APPARATUS AND METHOD

BACKGROUND OF THE INVENTION

1. Field of the Invention

This invention relates to a method and apparatus for detecting a moving object by detecting a change in an image of the object.

2. Description of the Related Art

Image processing techniques have been developed and used for a plurality of applications. One such application is for a monitoring apparatus which uses an image recognition technique. More specifically, such apparatus may be used to recognize a trespasser from an image taken by a TV camera.

A common technique for recognizing a trespasser is by using an image subtraction technique. That is, this technique (hereinafter referred to as an image subtraction technique) is characterized by using a TV camera to take two images at different times of an image area and subtracting the two images taken by the TV camera.

According to this technique, the subtracted image indicates a changing image such as may be caused by a moving object. The subtracted image can be analyzed so that the trespasser may be detected.

This image subtraction technique, however, has certain drawbacks. For example, the subtracted image includes the moving image corresponding to a moving object and a non-moving image corresponding to a fixed object or changing background conditions. This is partly due to the fact that background conditions and recording conditions vary. Recording conditions include weather, the position of the sun and the like. As these and other recording conditions vary, the image taken by the TV camera may vary even though there is no moving object in the image area. This may give rise to an erroneous indication of a moving object in the image area even though no moving object is present therein.

SUMMARY OF THE INVENTION

Accordingly, it is an object of the present invention to provide an apparatus that correctly detects a moving image within an image area corresponding to a moving object within the image area. It is a further object of the present invention to avoid erroneous indications of moving objects within an image area.

It is a further object of the present invention to provide an apparatus that detects the entire image of a moving object.

In accordance with the present invention, the foregoing objects, among others, are achieved by providing an apparatus for detecting a moving image corresponding to a moving object comprising input means for generating a signal corresponding to a scene including the moving object, subtraction means for subtracting signals generated by the input means at different times to obtain a subtracted image, localization means for setting an image area covering the subtracted image and analyzing means for detecting a moving object restricted to an image area set by the localization means.

In accordance with another aspect of the present invention, the above-stated objects and other objects are achieved by providing an apparatus for detecting a moving image corresponding to a moving object comprising input means for generating a signal corresponding to a scene including the moving object, subtraction means for subtracting signals generated by the input means at different times to obtain a subtracted image, boundary detection means for generating an edge signal corresponding to a boundary between an object and its background and neglection means for deleting the edge signal from a subtracted image signal.

BRIEF DESCRIPTION OF THE DRAWINGS

Other objects and many of the attendant advantages of the present invention will be readily appreciated as the invention becomes better understood by reference to the following detailed description when considered in connection with the accompanying drawings, in which like reference characters designate the same or similar parts throughout the figures thereof and wherein.

DETAILED DESCRIPTION OF THE PREFERRED EMBODIMENTS

A moving object detecting apparatus according to an embodiment of the present invention will now be described with reference to the accompanying drawings.

Figure 1:
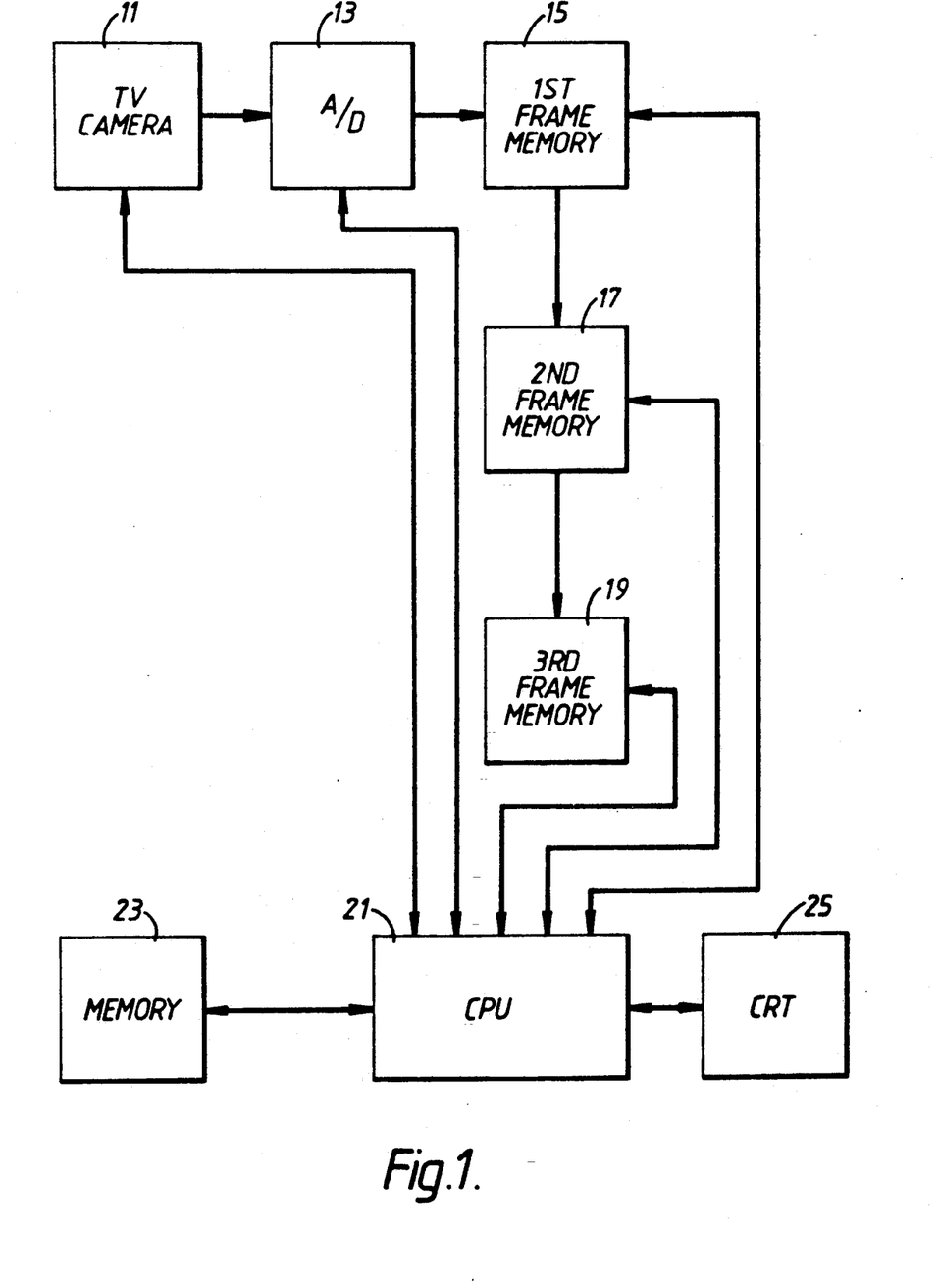
FIG. 1 is a block diagram of a monitoring apparatus according to the present invention.
Figure 2:
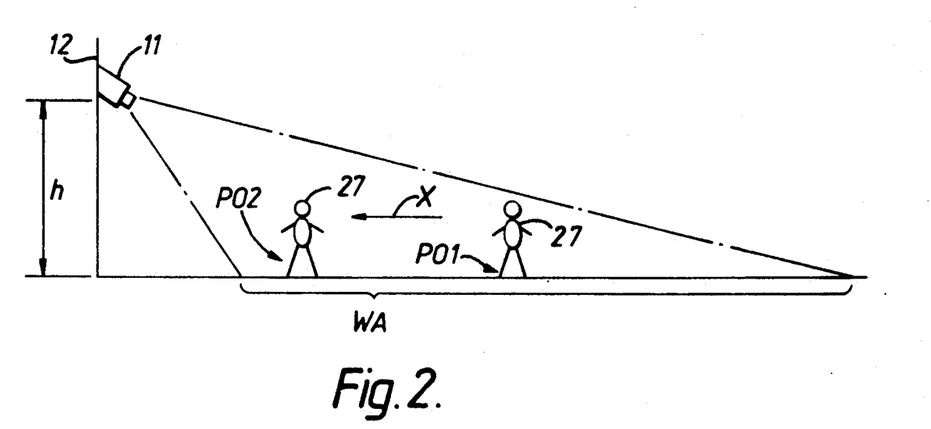
FIG. 2 is a schematic view of a person and a TV camera used in the monitoring apparatus shown in FIG. 1.

Referring now to FIG. 1, a moving object detecting apparatus, such as an image monitoring apparatus, includes an input device, such as TV camera 11, having a certain field of vision, for generating signals corresponding to an object within the field of vision of TV camera 11. The image monitoring apparatus may be used for security and/or safety purposes within a building for example, though other uses will be readily apparent to one of ordinary skill in the art. TV camera 11 may be located on a wall 12 (or other suitable mounting area) and may be directed to a position for watching a predetermined area WA as shown in FIG. 2. TV camera 11 generates signals, e.g., analog signals, for each pixel of each line of each scene. A scene refers to an image taken by TV camera 11 and is displayed by a display device as detailed later.

An A/D converter 13, coupled to an output of TV camera 11, converts analog signals supplied from TV camera 11 into digital signals. A/D converter 13, in cooperation with TV camera 11, outputs digital signals corresponding to a scene occurring at a predetermined time interval.

A first frame memory 15, coupled to A/D converter 13, successively stores the digital signals converted by A/D converter 13 with the predetermined interval. First frame memory 15 successively outputs the digital signal stored therein, under control of CPU 21 just before successively following signals from A/D converter 13 are stored corresponding to another interval.

A second frame memory 17, coupled to the output of first frame memory 15, successively stores the digital signals outputted by first frame memory 15. Second frame memory 17 successively outputs the digital signal stored therein under control of CPU 21, just before successively following signals from first frame memory 15 are input to second frame memory 17. As described below, signals stored in second frame memory 17 are used as a reference to determine whether an object is moving.

A third frame memory 19, coupled to the output of second frame memory 17, successively stores the digital signals outputted by second frame memory 17.

CPU 21, coupled to TV camera 11, A/D converter 13, first, second, and third frame memories 15, 17 and 19 respectively, controls TV camera 11, A/D converter 13, and first, second and third frame memories 15, 17 and 19. CPU 21 executes instructions in accordance with a program. During execution, CPU 21 temporarily stores signals in memory 23. CRT 25, coupled to CPU 21, displays an image corresponding to signals stored in first, second or third memory 15, 17 or 19. The image monitoring apparatus automatically monitors a predetermined area WA, within its field of vision. The monitoring apparatus may be located inside or outside of a structure such as a store, home, building, or the like. The image monitoring apparatus may be used to detect an object that is moving within the field of vision of the monitoring apparatus (hereinafter referred to as a moving object). This object may be a person or any other object that may enter the monitored area. This person may be an authorized person or an unauthorized person such as a trespasser or thief. If the image monitoring apparatus detects a moving object, it can provide an indication that a moving object is present in the monitored area. This moving object may relate to an unauthorized person or object, trespassers of thief. In order to determine the nature of the moving object, it is important for the image monitoring apparatus to detect the moving object correctly. Specifically, it is desirable to avoid erroneous indications of moving objects.

Figure 3:
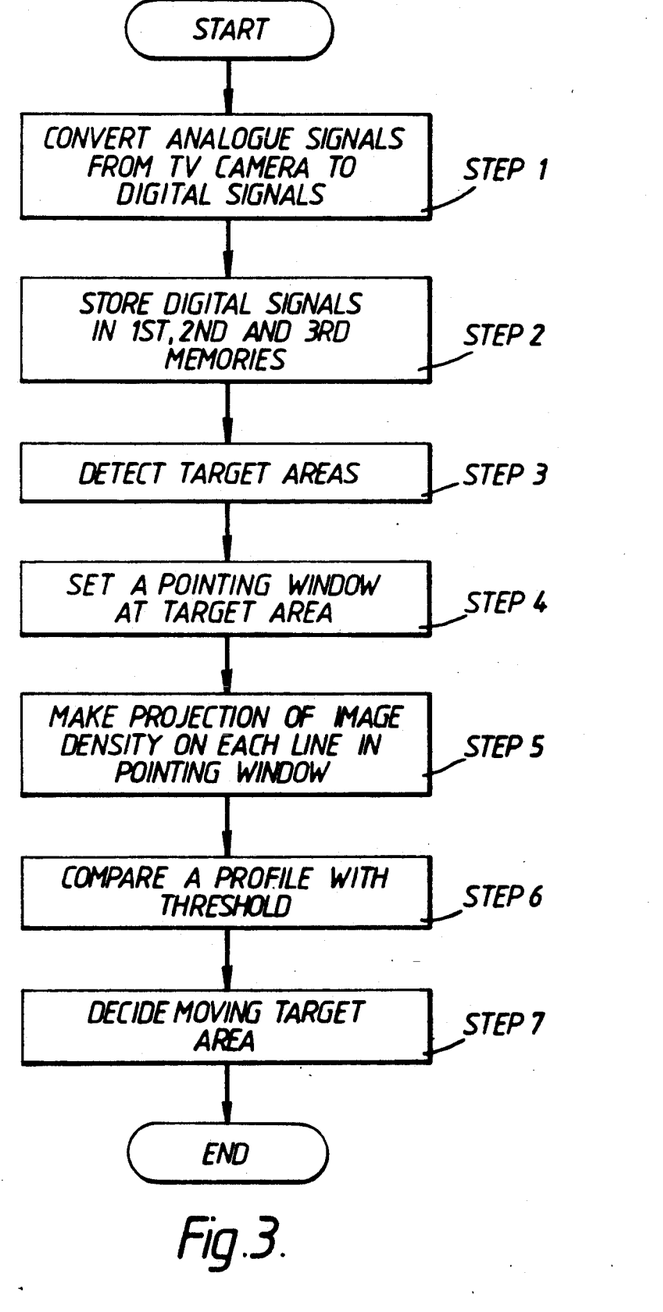
FIG. 3 is a flow chart illustrating the operation of a CPU used with the monitoring apparatus shown in FIG. 1 according to a first preferred embodiment of the present invention.

Referring now to FIG. 3, the outline of the operation of CPU 21 will be described. In step 1, CPU 21 controls TV camera 11 and A/D converter 13 to convert the analog signals corresponding to an image captured by TV camera 11 to digital signals corresponding thereto. Hereinafter signals corresponding to an image captured by TV camera 11 are referred to as an image signal. A/D converter 13 preferably convert the analog image signal into a 8 or 16 bit digital image signal, though other bit lengths may be used.

In step 2, the digital image signals generated in step 1 are stored in first, second, and third frame memories 15, 17, and 19 in a manner to be described below. At the time $t_0$, each of first, second, and third frame memories 15, 17, and 19 stores a digital image signal. First frame memory 15 stores the digital image signals input by TV camera 11 at the time $t_1$ ($t_1 > t_0$). Second frame memories 17 stores the digital image signal input by TV camera at the time $t_2$ ($t_2 > t_1 > t_0$). Third frame memory 19 stores the digital image signals input by TV camera at the time $t_3$ ($t_3 > t_2 > t_1 > t_0$). That is, the digital image signals stored in first frame memory 15 is the latest signals. The digital image signals stored in third frame memory 17 is the oldest.

In step 3, CPU 21 attempts to detect an area (hereinafter referred to as a target area) including an area in which the moving object is before an image of the moving object is detected, CPU 21 detects the target area that may include the image of the moving object. In order to define a target area, CPU 21 compares signals stored in first, second, and third frame memories 15, 17, and 19. As described later, CPU 21 expresses the target area by a binary signal.

In step 4, CPU 21 sets a pointing window over the target area. The pointing window defines an area in which CPU 21 attempts to detect the moving object as described later. The pointing window may be a rectangle or other geometric configuration including the target area. Preferably, CPU 21 may use position data corresponding two diagonal points of such a rectangle.

In step 5, CPU 21 gets information of image density of pixel indicated by signals stored in second frame memory 17 on each line in the pointing window. Signals stored in second frame memory 17 is indicated by multiple bit data, e.g., 8 bit data. These signals, indicated by multiple bit data, represent image density. CPU 21 reads signals stored in second frame memory 17 in order of pixel and line. Hereinafter, getting information of image pixel density is referred to as making a projection. Signals corresponding to all pixels of one line are referred to as a line projection.

In step 6, CPU 21 compares the line projection with a threshold. For example, CPU 21 may generate a "1" signal if the line projection is larger than the threshold. CPU 21 may generate a "0" signal if the line projection is smaller than the threshold. Therefore, a combination of "0" and "1" signals are generated for each line of a scene.

In step 7, CPU 21 interprets a group of two or more "1" signals to indicate a moving object.

Figure 4:
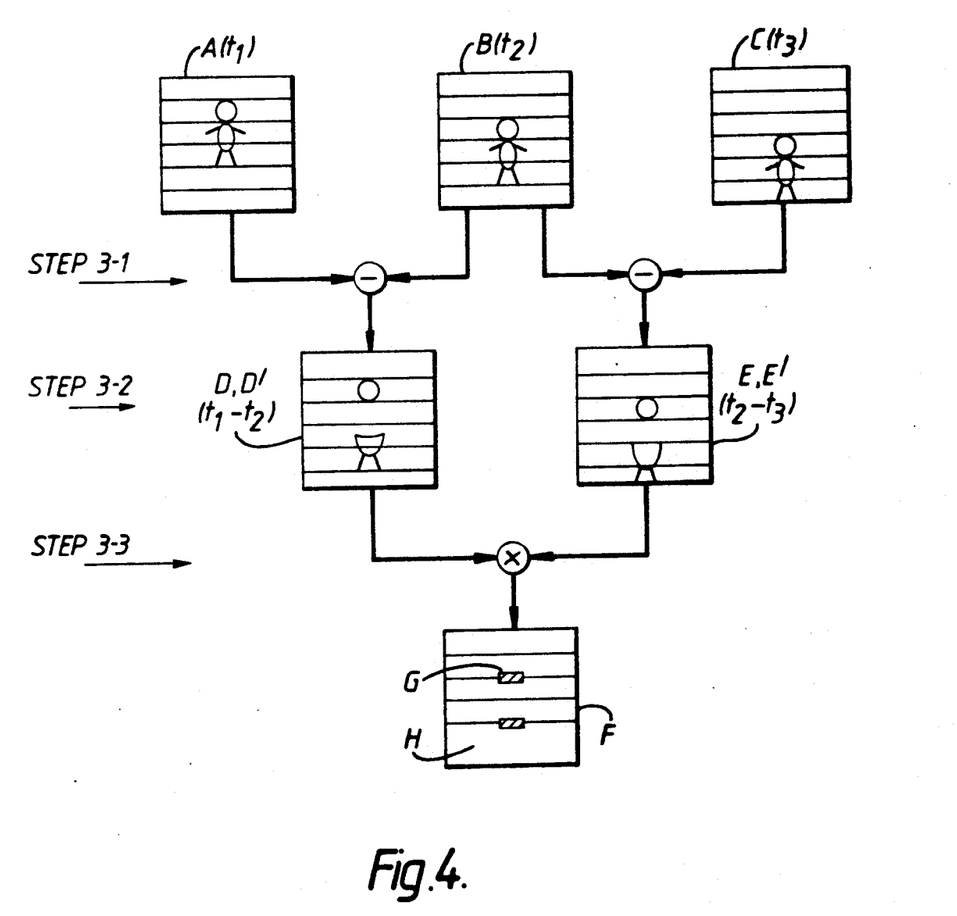
FIG. 4 illustrates an example of the operation of the CPU from step 1 to step 3 shown in FIG. 3.

Referring now to FIG. 4, the details of step 3 of FIG. 3 will be explained. First frame memory 15 stores signals (hereinafter referred to as signal A) corresponding to a scene A. Second frame memory 17 stores signals (hereinafter referred to as signal B) corresponding to a scene B. Third frame memory 19 stores signals (hereinafter referred to as signal C) in accordance with a scene C. Scenes A, B, and C are taken by TV camera 11 at the times $t = t_1$, $t_2$ and $t_3$, respectively, ($t_1 < t_2 < t_3$). For the sake of example, FIG. 4 illustrates scenes of a person 27 moving towards a TV camera in the direction of the arrow X shown in FIG. 2.

In step 3-1, (a substep of step 3) CPU 21 subtracts signal B from signal A and subtracts signal C from signal B (ignoring the sign of the result). By subtracting signal B from signal A, CPU 21 gets signals (hereinafter referred to as signal D) corresponding to an image indicated by D in FIG. 4. Signal D indicates a head and legs of person 27 as the difference between signals A and B. Subtracting signal C from B, CPU 21 gets signal E corresponding to an image indicated by E in FIG. 4. Signal E indicates a head and legs of the person as the difference between signals B and C.

In step 3-2, (a substep of step 3) CPU 21 compares each of signals D and E with a threshold signal. The threshold signals are set substantially equal to the background image so that subtraction of the threshold signals from the image signal separates the signals due to the background from signals due to the moving object to minimize false indications of movement due to changes in the background. CPU 21 generates a "1" signal if signal D or E is larger than the threshold signal. CPU 21 generates a "0" signal if signal D or E is smaller than the threshold signal. CPU 21 get two groups of "0" and "1" signals in accordance with the comparison of signals D and E with the threshold signal. These two groups of "0" and "1" signals are hereinafter referred to as signals D' and E'.

In step 3-3 (a substep of step 3), CPU 21 performs a logic AND operation between signals D' and E'. Based on this operation, CPU 21 gets two groups of "1" signals, hereinafter referred to as signals G and H as shown in FIG. 4. Signal D' represents a change in an image between times t1 and t2. Signal E' represents a change in an image between times $t_2$ and $t_3$. Signals G and H represent a change in an image between time $t_1$ and $t_2$ and time $t_3$, where the reference image is taken at time $t_2$. The image shown in FIG. 4, frame F corresponding to signals G and H is referred to as a subtracted image. In summary, signal D is derived by subtracting A and B, and signal E is derived by subtracting signals B and C. Signals D and E represent a change in an image based on a comparison of signals A with B and B with C, where signal B is used as a reference. Theoretically, after logic AND operation takes place between signals D and E, there should be all "0" signals and no image would be displayed. However, recording conditions vary every moment. For example, light conditions vary as the sun moves or as the weather varies. As light conditions vary, TV camera 11 perceives different image information even though there is no moving object present. Actually, CPU 21 can get signals G and H in accordance with the boundary between the moving object and its background as will be further discussed below.

Image information of the moving object, e.g., the person, includes image information in accordance with signals G and H. It is important that non-changing part disappears after the subtraction and the logic AND operation.

CPU 21 determines a target area by defining an area including the subtracted image corresponding to signals G and H and the moving object. The target area refers to an area including the moving object, as described above.

Figure 5A:
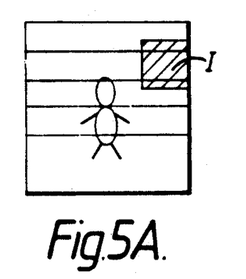
FIGS. 5A-G illustrate an example of the operation of the CPU from a step 4 to a step 7 shown in FIG. 3.
Figure 5B:
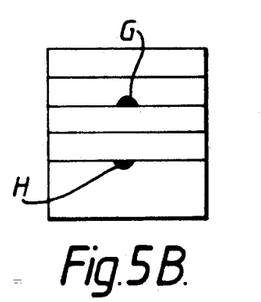
Figure 5C:
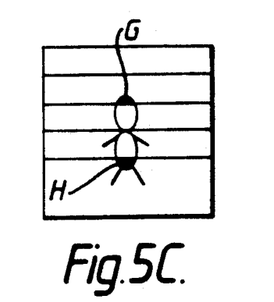

FIG. 5(A) shows the image in accordance with the moving object taken by TV camera 11. The image is the same as that indicated by B shown in FIG. 4. Furthermore there is a fixed object 5, such as a desk, by the moving object, such as the person. FIG. 5(B) shows the subtracted image obtained in the manner described above. FIG. 5(C) shows superposition of the subtracted image (Signals G and H) on the image (Signal B) of the moving object. The subtracted image overlaps the image in accordance with a head and a waist of the person as shown in FIG. 5(C). In this case, the target area is estimated as the area including the signals G and H. Detecting the target area means detecting the area including the moving object.

Figure 5D:
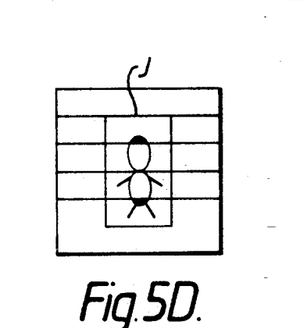
Figure 5E:
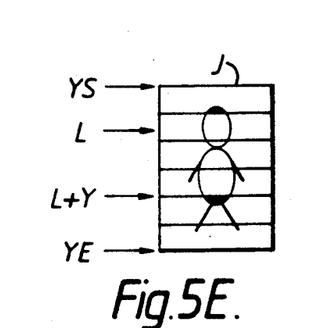

CPU 21 sets the pointing window at the target area in step 4 (FIG. 5D). In a step 4-1, a substep of step 4, CPU 21 gets the center of gravity of the image in accordance with the moving object. In order to get the center of gravity of the image, CPU 21 distinguishes the image corresponding to the person from the background image. At first, CPU 21 compares the signal level of each pixel with the threshold signal CPU 21 thereby generates the binary image signal discussed above.

By transforming the multilevel image stored in second frame memory 17, into the binary image, CPU gets a clear-out image, i.e., the image of the background represented by a "0" signal and the non-background image, including the moving object and other fixed object(s) represented by a "1" signal.

CPU 21 then subtracts the image within the image area in accordance with signals G and H from the clear-out image. To be exact, CPU 21 stores the position data of signals G and H and the image of the non-background image of the clear-out image. CPU 21 subtracts the image which has the position data including those in coincidence with signals G and H. As the image in accordance with signals G and H is included in the moving object as described above, the image taken by CPU 21 corresponds to the image of the moving object. It is preferred to adopt the largest subtracted image if there are a plurality of subtracted images.

After CPU 21 takes out the binary image corresponding to the moving object, CPU 21 calculates the center of gravity for the image of the moving object as described above.

Next, CPU 21 sets the pointing window J as shown in FIG. 5(D) so that the center of gravity of the pointing window J coincides with that of the image of the moving object. The dimension and shape of the pointing window J is selected by a user at the start of the operation. This step will be explained in more detail below.

CPU 21 may use the position data of signals G and H to determine the position of the pointing window J. That is, CPU 21 moves the pointing window J so that the pointing window J covers an area including at least signals G and H.

As described above, CPU 21 sets the pointing window J against the image of the moving object. It is important for the pointing window J to cover the image of the moving object.

Next, CPU 21 implements step 5, i.e., making the projection of image density on each pixel on each line in the pointing window. In step 4, CPU 21 gets the position data of the pointing window J, e.g., the position data of four corners of the pointing window J. CPU 21 reads the signals along each line within the pointing window J, which is stored in second frame memory 17. As described above, CPU 21 attempts to find the moving object from the signals stored by second frame memory 17.

Figure 5F:
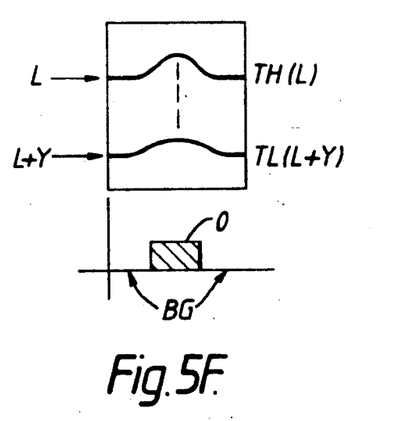

According to the present invention, signals in second frame memory 17 are indicated by an image density with multiple level bit data. CPU 21 gets the projection along each line by reading from signals stored in second frame memory 17. CPU 21 then compares the signals read from CPU 21 with a threshold signal TH (L) in order to separate a part O due to the moving object from a part due to the background BG. According to the present invention, the threshold signal TH (L) is determined as follows. An observing the image corresponding to the person, it is noticed that there are different densities from part to part. For example, in the case where the signal is expressed in the form of 8 bit data, e.g., the density may range from zero (0) to two hundred fifty five (255), where the density of the image in accordance with a head is on the order of about thirty (30) to sixty (60). The density of the image in accordance with the background is on the order of about one hundred (100). The density of the image of a cloth is on the order of about one hundred and forty (140) to one hundred and eighty (180). If the threshold signal TH (L) is constant for adjacent lines, it is difficult to separate part O of the moving object from the part of the background BG. In the present embodiment, the moving object may be limited to the person. The size of the pointing window is set to a predetermined size. So, it is correct to estimate the image density at a plurality of lines of the pointing window. Considering the estimated image density, the threshold signal TH (L) is determined so that the threshold signal TH (L) may separate part O of the moving object from the part of the background BG. FIG. 5(f) shows the example of signals of line L and L+Y and thresholds TH (L) and TH (L+Y). FIG. 5(f) furthermore shows the example of the result after comparing the signal of line L with threshold TH (L).

Figure 5G:
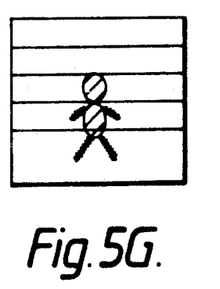
Figure 8A:
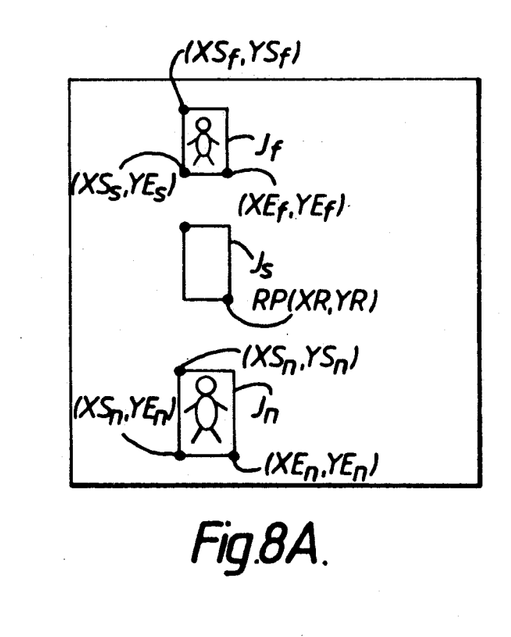
FIGS. 8A and B illustrate displays on a screen of a CRT used in the second preferred embodiment.

FIG. 5(G) shows the exmaple after comparing the signals on each line with each corresponding threshold. After comparing the signals on each line with each threshold, CPU 21 gets the profile of the moving object. At the same time, CPU 21 may separate the moving object from the background in detail. An oblique line in FIG. 8A is used to indicate the moving object, e.g., the person. For convenience, an oblique line with different angle from that over the body is adapted over the legs and arms. In determining the threshold signal TH (L) adequately, the entire image corresponding to the person may be detected as shown in FIG. 5-G.

Figure 6:
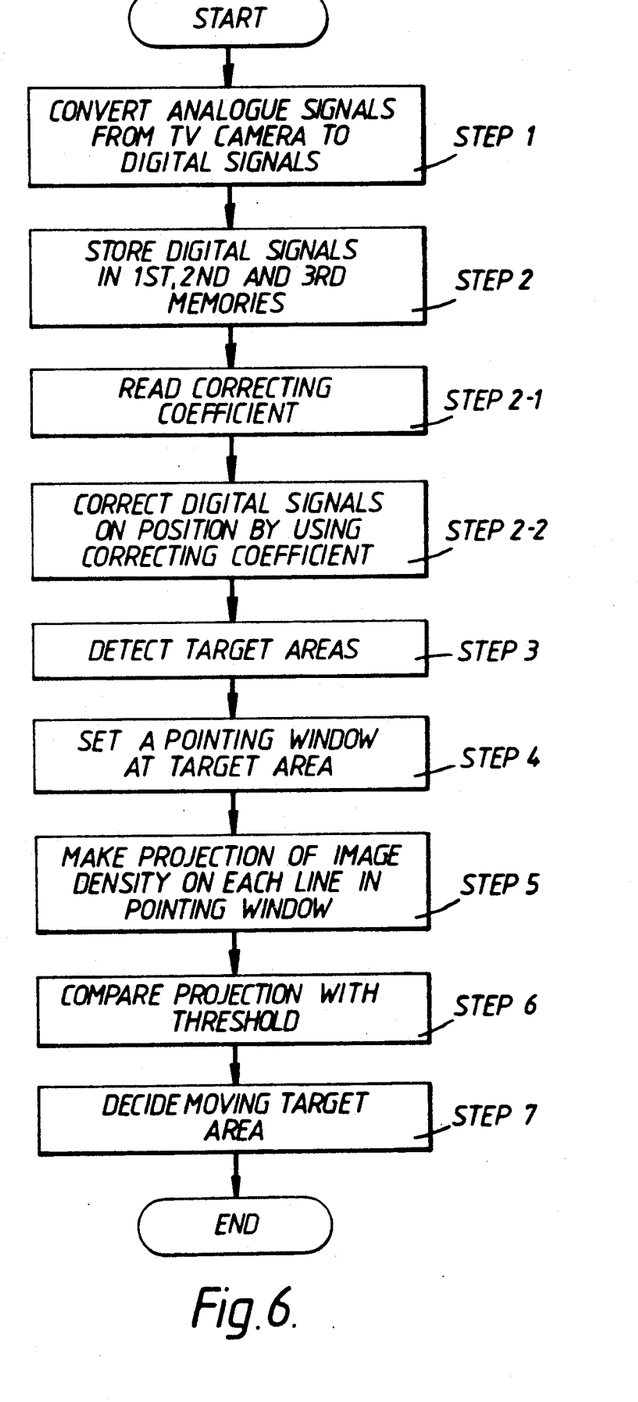
FIG. 6 is a flow chart illustrating the operation of the CPU according to a second preferred embodiment of the present invention.

Referring now to FIG. 6, a second preferred embodiment will be explained. A difference between the first and the second embodiment involves the steps for correcting the position data based on the fact that the size of the image perceived by TV camera 11 varies based on the relative distance between the object and TV camera 11.

According to the present embodiment, steps 2-1 and 2-2 are inserted into the steps used in the first embodiment shown in FIG. 3. These steps are used for correcting the size of the moving object. This is because the size of the image taken by TV camera 11 varies due to the length or angle between TV camera 11 and the object.

Figure 7:
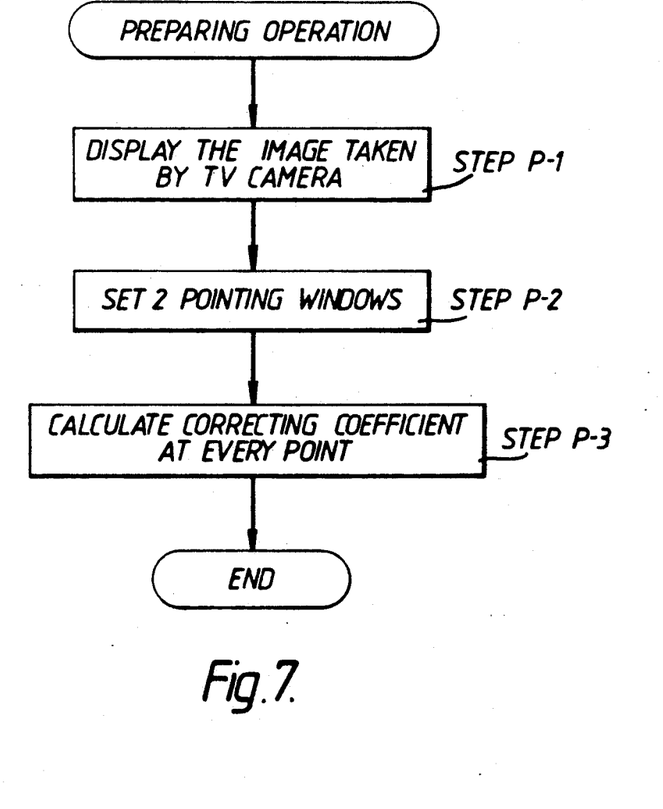
FIG. 7 is a flow chart illustrating a preparing operation performed prior to the operation shown in FIG. 6.

According to the present embodiment, preparation is needed. Referring now to FIG. 7, preparation begins with a step P-1. In step P-1, CPU 21 displays the image taken by TV camera 11 on CRT 25.

For example, TV camera 11 takes the image for two persons. As shown in FIG. 2, one person stands at a first position PO-1. Another person stands at a second position PO-2 which is nearer to TV camera 11 than first position PO-1. In this case, CRT 25 displays the image as shown in FIG. 8(A). The image in accordance with the person at second position PO-2 is larger than that at first position.

In a step P-2, an operator designates two pointing windows $J_f$ and $J_n$ covering the image of the person at first and second positions PO-1 and PO-2. For example, the operator designates two corner points of pointing window $J_f$, e.g., ($XS_f$, $YS_f$) and ($XE_f$, $YE_f$). For pointing window $J_n$, the operator designates two corner points ($XS_n$, $YS_n$) and ($XE_n$, $YE_n$).

In a step P-3, CPU 21 calculates a correcting coefficient assuming the following conditions;

1. The pointing window is rectangular.
2. The horizontal dimension of the image of any given object does not appear to vary. This is because as a person moves in a direction towards TV camera 11, the main change of the image takes place in a vertical dimension of the image. Therefore, the horizontal dimension of the pointing window, which covers the image corresponding to the object, does not appear to vary either.
3. A linear correction is made.

This is because the height of the pointing window, i.e., ($YS_f$-$YE_f$) or ($YS_n$-$YE_n$) may vary linearly.

Under the above conditions. CPU 21 may ignore the correction of X-coordinate and only correct the Y-coordinate. However, X-coordinate correction could be made if desired.

CPU 21 calculates the height of the two pointing windows Jf and Jn. For example, CPU 21 gets height data (YSf-YEf) for pointing window Jf. CPU 21 gets height data (YSn-YEn) for pointing window Jn. The height data should be in proportion to the position data relative to the nearest position within the pointing window to TV camera 11 (hereinafter referred to as the reference point). For example, the reference point of pointing window Jn is (XSn, YEn). The reference point of pointing window Jf (is XSf, YEf). According to a preferred embodiment, the correction of X-coordinate may be ignored. So, the correcting coefficient is ((YSf-YEf)−(YSn-YEn)) (YEf-YEn). CPU 21 store the correcting coefficient. When the reference position RP (XR, YR) is designated for the pointing window $J_s$, CPU 21 gets the corrected height $H_c$ of the pointing window $J_s$ by using the height of pointing window Jn, the correcting coefficient and the reference point RP according to the following expression;

$H_c$ = (the correcting coefficient) x (the Y-coordinate of the reference position) + (a constant Z) where $$\text{the correcting coefficient} = \frac{(YS_f - YE_f) - (YS_n - YE_n)}{YE_f - YE_n}$$

$$\text{the constant } Z = \frac{YE_n YS_f - YE_f YS_n}{YE_f - YE_n}$$

Figure 8B:
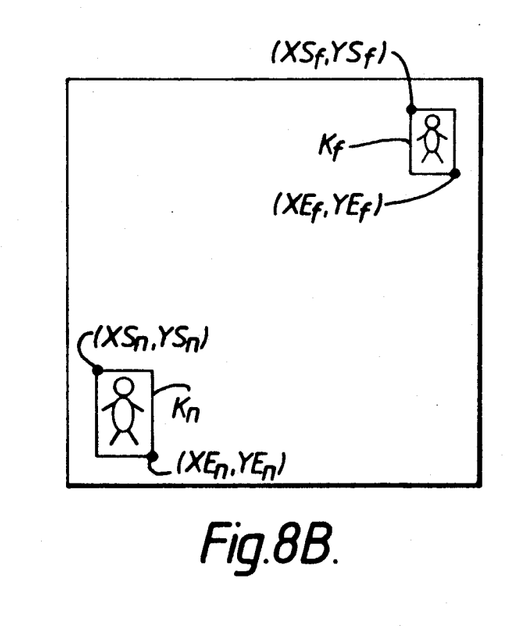

If it is desirable to correct the X-coordinate, in step P-2, the operator designates two pointing windows Kn and Kf against two images as shown in FIG. 8(B). In this case, it is convenient to assume that a correcting coefficient of the X-coordinate is the same as that of Y-coordinate. However, it may be more desirable to consider the aberration of lens of TV camera 11 for the correction of X-coordinate.

Considering the correction of X-coordinate under the conditions as stated above, CPU 21 corrects the length of the pointing window by using the position data of reference point, the length of pointing window Kn and the correcting coefficient as same as that of Y-coordinate. It is desirable to store in memory 23 the relation between the position data of the reference points and the corrected height and length of the corresponding pointing window after calculated.

Figure 9:
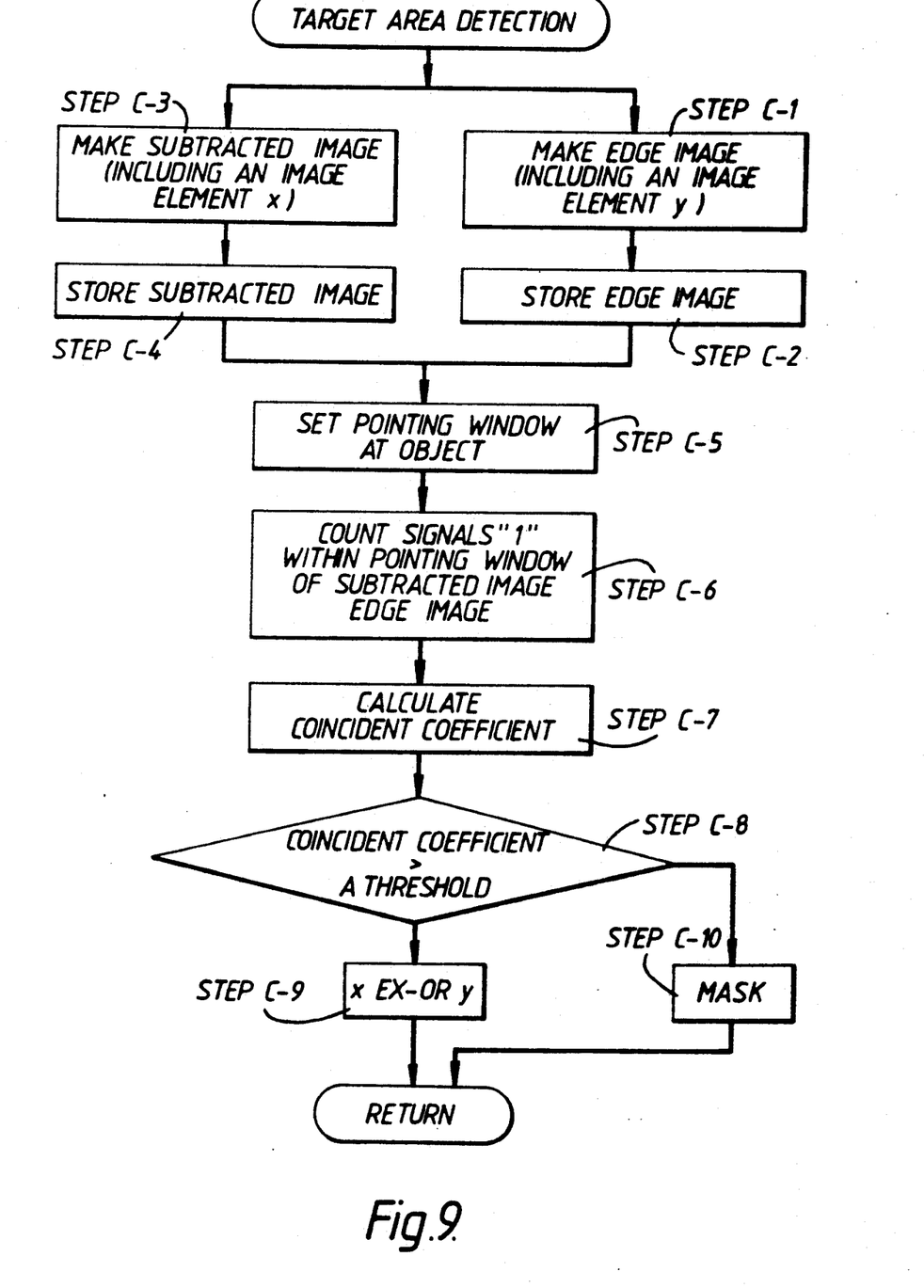
FIG. 9 is a flow chart illustrating the operation of the CPU according to a third preferred embodiment of the present invention.

Referring now to FIG. 9, a third preferred embodiment is explained.

A difference between the first and third embodiments involves how the target area is detected, e.g. regarding step 3 shown in FIG. 3.

Figure 10A:
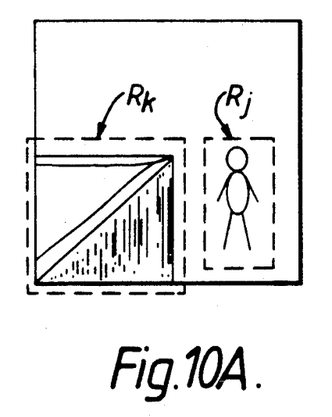
FIGS. 10A-D, 11A-F and 12A-F illustrate examples of the operation of the CPU in accordance with the flow chart shown in FIG. 9.

In step C-1, CPU 21 detects a changing area by using three images corresponding to first, second, and third frame memories 15, 17 and 19, respectively as shown in FIG. 1. For example, FIG. 10(A) shows the image taken by TV camera 11 and stored in second frame memory 17 at the present time. The image is represented by a multilevel signal. Area Rj includes an image corresponding to a movable object, such as a person. Area Rk includes an image corresponding to a fixed object, such as a wall.

First CPU 21 get an edge image of the image in accordance with signals stored in second frame memory 17. The edge image refers to an image corresponding to the boundary between an object and its background or another object. That is, CPU 21 differentiates the image to get a differential coefficient at every point on the screen of CRT 25. CPU then compares the differential coefficient with a threshold.

CPU 21 may get a higher differential coefficient at the boundary between an object and background or another object in the image displayed in CRT 25. By comparing the differential coefficient with the threshold, CPU 21 gets the edge image of the image taken by TV camera 11, which indicates the edge of the object in the scene taken by TV camera 11. For the scene shown in FIG. 10(A), CPU 21 gets the edge image shown in FIG. 10(B).

The edge image is represented in binary. So, CPU 21 stores a "1" or "0" signal in accordance with position data in a step C-2.

In a step C-3, CPU 21 gets a subtracted image from signals stored in memories 15, 17 and 19 in the same way shown in FIG. 5. Theoretically, the subtracted image fails to include an image coming from the wall, which is fixed. CPU 21, however, gets the subtracted image including the image coming from the edge of the wall shown in FIG. 10(C). This is because recording conditions often varies. Recording conditions means weather, the position of sun and so on. These recording conditions vary from time $t_1$ to time $t_2$ so that CPU 21 gets a subtracted image including the image due to the wall. Note that the image coming from the fixed object, such as a wall, is thin and the image coming from the moving object, such as the person, is thick. This is due to the fact that a thicker image occurs due to more movement and a thin image corresponds to less change from one scene to the next.

In step C-4, CPU 21 stores the binary representation of the subtracted image in memory 23. In step C-5, CPU 21 sets the pointing windows to cover areas Rj and Rk as described above. The binary representation of the image due to the wall, however, is wide so that one pointing window may fail to cover the wall image. In this case, before setting the pointing window, CPU 21 divides the CRT frame image into a plurality of parts, e.g., two or more parts. For example, it may be sufficient to divide the frame into two parts including the areas Rj and Rk respectively. It is easy to subdivide the frame image, due to its binary representation. It is possible to set a plurality of pointing windows. Each pointing window preferably covers an image including a subtracted image.

According to the present embodiment, CPU 21 first attempts to set the pointing window over the area Rj including the image of the moving object (in this case a person). When CPU 21 sets the pointing window to corresponding area Rj and determines that the pointing window fails to cover the area Rj, CPU 21 divides the frame image into two parts including areas Rj and Rk, respectively. CPU 21 then sets the pointing window in accordance with the divided part including the area Rk.

In step C-6, CPU 21 counts the number of "1" signals due to each of the edge image and the subtracted image within the pointing windows.

For example, the edge image within the pointing window in accordance with the area Rj has Nj "1" signals. The subtracted image within the pointing window in accordance with the area Rj has Mj "1" signals.

The edge image within the pointing window in accordance with the area Rk has Nk "1" signals. The subtracted image within the pointing window in accordance with the area Rk has Mk "1" signals.

Figure 10B:
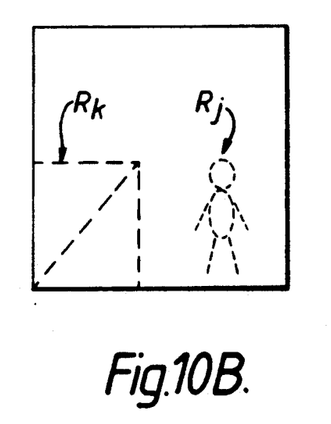
Figure 10C:
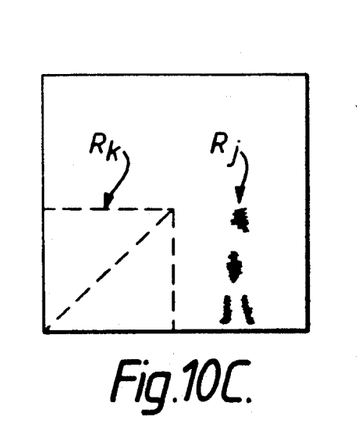

In step C-7, CPU 21 calculates a coincidence coefficient M/N. For example CPU 21 calculates the two coincidence coefficients Mj/Nj and Mk/Nk. As shown in FIGS. 10(B) and (C), both Nj and Nk are small. Mj, however, is large and Mk is small.

In step C-8, CPU 21 compares the coincidence coefficients with a threshold corresponding to a background. If the coincidence coefficient is larger than the threshold, CPU 21 performs an Exclusive OR between the image element of the subtracted image and the edge image in step C-9. By performing this Exclusive OR operation, the edge line is eliminated from the subtracted image. This is because the edge image is superimposed on the boundary between the background and the object, that includes the subtracted image.

If the coincidence coefficient is smaller than the threshold, CPU 21 ignores the signals within the present pointing window due to the subtracted image (in step C-10). That is, even though TV camera gets an image within the pointing window, CPU 21 interprets the image as noise for purposes of detecting the moving object.

In this step, CPU 21 may ignore the signals corresponding to the edge image. That is, CPU 21 masks the signals within the present pointing window due to the subtracted image, based on to the positions of "1" signals within the present pointing window due to the edge image. It is more desirable that CPU 21 masks the signals relating to the subtracted image, referring to the position data of "1" signal and its "neighborhood", e.g., two or three pixles adjacent to the edge image, within the present pointing window due to the edge image. This step is hereinafter referred to as a masking step. In the masking step, the edge image area is hereinafter referred to as a masking area. This is because the signals within the pointing window due to the subtracted image, corresponding to "1" signals within the pointing window due to the edge image, is ignored or masked.

Figure 10D:
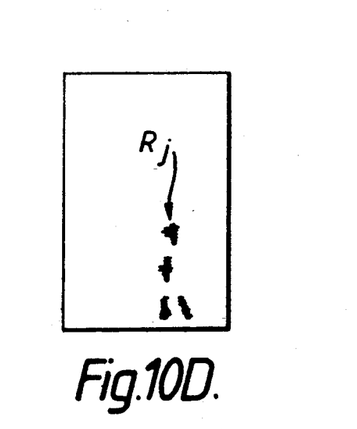

FIG. 10(D) shows an example of what remains after CPU 21 completes the steps for detecting the target area. CPU 21 leaves the image corresponding to the person and deletes the image corresponding to the fixed object.

Referring now to FIGS. 11 and 12, the details of how the CPU eliminates the boundary between the object and the background is explained.

FIG. 11 shows an example of such elimination when the coincidence coefficient (M/N) is larger than the threshold (T). For example, if there the subtracted image signal (M) is greater than the edge image (N) within the pointing window. In FIG. 11, stripes S, T and U indicate the vertical segments of a pointing window image element at rear the boundary when the coincidence coefficient (M/N) is larger than the threshold.

Figure 11A:
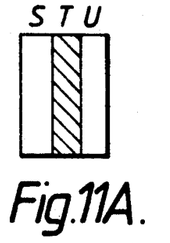
Figure 11B:
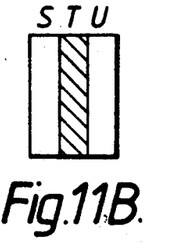
Figure 11C:
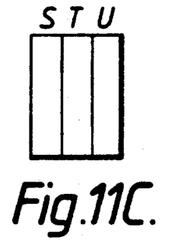

FIGS. 11(A), (B) and (C) are one set. FIG. 11(A) shows the edge image in stripe T. FIG. 11(B) shows the substracted image in stripe T. After performing an exclusive or operation between the edge image and subtracted image, the result shown in FIG. 11(C) is obtained. This result indicates that CPU 21 has failed to find a moving object.

Figure 11D:
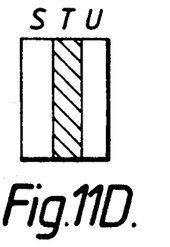
Figure 11E:
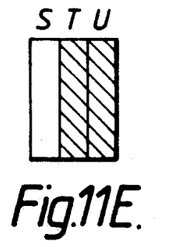
Figure 11F:
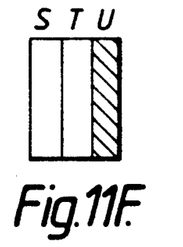

FIGS. 11(D), (E) and (F) are one set. FIG. 11(D) shows the edge image in stripe T. FIG. 11(E) shows the subtracted image in stripes T and U. Here, the subtracted image is thicker than the edge image as in the case where there is a moving object. After performing an exclusive or between the edge image of FIG. 11(d) and the subtracted image of FIG. 11(E), the result shown in FIG. 11(f) is obtained. This indicates that CPU 21 has determined the presence of a portion of a moving object within a certain area corresponding to the position of stripe U.

FIG. 12 shows an example of such elimination when the coincidence coefficient is smaller than the threshold. That is, when the image corresponding to a fixed object is greater than an image from a moving object.

Figure 12A:
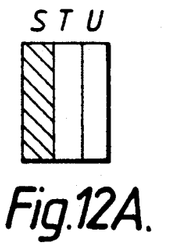
Figure 12B:
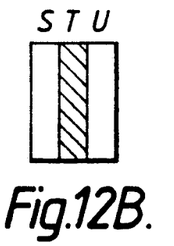
Figure 12C:
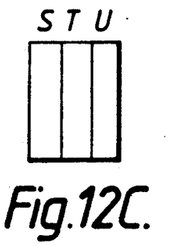

FIGS. 12(A), (B) and (C) are one set. FIG. 12(A) shows the edge image in stripe S. FIG. 12(B) shows the subtracted image in stripe T. After performing the masking step, the result of FIG. 12(C) is obtained indicating that there is no moving objected detected.

Figure 12D:
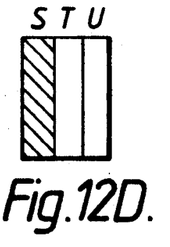
Figure 12E:
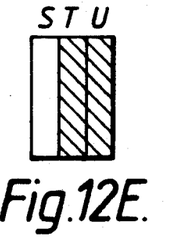
Figure 12F:
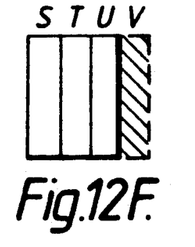

FIGS. 12(D), (E) and (F) are one set. FIG. 12(D) shows the edge image in stripes. FIG. 12(E) shows the subtracted image in stripes T and U. In this case, CPU 21 ignores or masks the image in stripes T and U because the mask area extends to stripes T and U. In the case of FIGS. 12(D), (E) and (F), CPU 21 makes the subtracted image. The subtracted image to be detected, however, is not deleted. This is because the subtracted image corresponding to the moving object is found in stripe V, adjacent to stripe U, indicating a moving object within the pointing window.

In above embodiment, it may be desirable to correct the size of the pointing window as the magnification of the TV camera is varied.

In the above embodiment, it may be desirable that CPU 21 uses a single pointing window to simplify the process. In this case, CPU 21 skips step C-5 for setting the pointing window and calculates one coincidence coefficient M/N. For example, CPU 21 sets M equal to 70 corresponding to the edge image as shown in FIG. 10(B). CPU 21 sets N equal to 100 corresponding to the subtracted image as shown in FIG. 10(C). So, CPU 21 calculates the coincidence coefficient M/N equal to 0.7.

Furthermore, the threshold may be set at 0.6. In this case, the coincidence coefficient (M/N) is larger than the threshold. Therefore, CPU 21 performs the Exclusive OR operation between signals due to the subtracted image and the edge image.

Other objects, features and advantages of the present invention will become apparent from the above detailed description. it should be understood, however, that the detailed description and specific examples while indicating preferred embodiments of the invention, are given by way of illustrations only, since various changes and modifications within the spirit and scope of the invention will become apparent to those skilled in the art.

I claim:

1. An apparatus for detecting a moving image corresponding to a moving object within a fixed field of view of a monitoring device, the apparatus comprising:
   input means for generating signals corresponding to a scene, corresponding to said fixed field of view, and including the moving object, at first and second times;
   subtraction means for subtracting the signal generated by said input means at said first time from the signal generated by said input means at said second time to generate a subtracted image signal;
   localization means for setting an image area covering a portion of said subtracted image signal; and
   detection means for detecting movement of said moving object based on the subtracted image signal only in the image area set by said localization means.

2. The apparatus of claim 1, wherein said input means comprises line input means for generating multilevel signals along each scanning line; said detection means comprising comparing means for comparing the multilevel signals with a threshold; and further comprising means for generating a detection signal in response to a result of the comparison made by said comparing means.

3. The apparatus of claim 1, wherein said localization means sets the image area to cover the moving image.

4. The apparatus of claim 1, wherein the dimension of the image area is fixed.

5. The apparatus of claim 2, wherein said comparing means compares the multilevel signals with one threshold selected from a plurality of thresholds corresponding to a particular line.

6. An apparatus for detecting a moving image corresponding to a moving object within the field of view of a monitoring device, the apparatus comprising:
   input means for generating signals corresponding to a scene, including the moving object, at first and second times;
   correction means for correcting the signals in accordance with the distance between the moving object and said input means;
   subtraction means for subtracting the signal generated by said input means at said first time and corrected by said correction means from the signal generated by said input means at said second time and corrected by said correction means to generate a subtracted image signal;
   localization means for setting an image area covering at least a portion of said subtracted image signal;
   detection means for detecting movement of said moving object based on the subtracted image signal in the image area set by said localization means.

7. The apparatus of claim 6, further comprising: means for generating at least two position signals corresponding to at least two positions of the moving object; means for calculating a correcting coefficient based on said at least two position signals.

8. An apparatus for detecting a moving image corresponding to a moving object, the apparatus comprising:
   input means for generating signals corresponding to a scene including the moving object, at first and second times;
   subtraction means for subtracting the signals generated by said input means at the first time from the signals generated by said input means at the second time to generate a subtracted image signal;

boundary detection means for generating an edge signal corresponding to a boundary between the object and its background; and neglection means for deleting the edge signal from the subtracted image signal.

9. The apparatus of claim 8, further comprising: evaluation means for comparing the subtracted image signal with the edge signal;

generating means for generating an image signal if the substracted image signal corresponds to an image signal and the edge signal corresponds to a non-image signal at the same position; and selection means for selecting one signal from each of said neglection means and said generating mean;

wherein said moving object is detected based on said signal from said neglection means and said generating means.

10. The apparatus of claim 8, wherein said neglection means deletes the edge signal and neighborhood signals corresponding to the neighborhood of the boundary from the subtracted image signals.

11. The apparatus of claim 8, further comprising:

division means for dividing the signals generated by said input means into a plurality of groups of signals;

evaluation means for comparing the subtracted image signal with the edge signal within each group of signals;

logic means for performing a arithmetic logic operation between the subtracted image signal and the edge signal; and selection means for selecting one signal from each of said neglection means and said logic means;

wherein said moving object is detected based on said signals from said neglection means and said logic means.

12. A method for detecting a moving image corresponding to a moving device within a fixed field of view of a monitoring device, comprising the steps:

generating signals corresponding to a scene corresponding to said fixed field of view, and including the moving object, at first and second times;

subtracting the signal generated by said generating step at the first time from the signal generated by said generating step at the second time to generate a subtracted image signal;

setting an image area covering a portion of the subtracted image signal;

detecting movement of the moving object based on the subtracted image signal only in the image area set by said setting step.

13. The method of claim 12, wherein said generating step comprises the step of generating multilevel signals along each scanning line; said detecting step comprises the step of comparing the multi-level signals with a threshold; and further comprising the step of generating a detection signal in response to a result of the comparison made by said comparing step.

14. The step of claim 12, wherein the dimension of the image area is fixed.

15. The step of claim 13, wherein said comparing step includes the step of comparing the multi-level signals with one threshold selected from a plurality of thresholds corresponding to a particular line.

16. A method of detecting a moving image corresponding to a moving object within the field of view of a monitoring device, comprising the steps:

generating signals corresponding to a scene, including the moving object, at first and second times;

correcting the signals in accordance with the distance between the moving object and said monitoring device;

subtracting the signal generated by said generating step at the first time and corrected by said correcting step from the signal generated by said generating step at the second time and corrected by said correcting step to generate a subtracted image signal;

setting an image area covering at least a portion of the subtracted image signal; and detecting movement of the moving object based on the subtracted image signal in the image area set by said setting step.

17. The method of claim 16, further comprising the steps of:

generating at least two position signals corresponding to at least two positions of the moving object; and calculating a correcting coefficient based on at least two positions data.

18. A method for detecting a moving image corresponding to a moving object, the method comprising the steps of:

generating a signal corresponding to a scene, including the moving object, at first and second times;

subtracting the signals generated by said generating step at the first time from the signals generated by the generating step at the second time to generate a subtracted image signal;

generating an edge signal corresponding to a boundary between an object including the moving object and a background;

deleting the edge signal from the subtracted image signal; and detecting movement of the object based on the subtracted image signal deleted by said deleting step.

19. The method of claim 18, further comprising the steps of:

comparing the subtracted image signal with the edge signal;

generating an image signal if the subtracted image signal and the edge signal corresponds to a non-image signal at the same position; and selecting one signal from each of said deleting step and said generating step;

wherein said moving object in detected based on the signal from said deleting step and/or said image signal generating step.

20. The method of claim 18, wherein said deleting step comprises the step of deleting the edge signal and neighborhood signals corresponding to the neighborhood of the boundary from the subtracted image signals.

21. An apparatus for detecting a moving image corresponding to a moving object within the field of view of a monitoring device, the apparatus comprising:

input means for generating signals corresponding to a scene, including the moving object, at first and second times;

correction means for correcting the signals in accordance with the distance between the moving object and said input means;

subtraction means for subtracting the signal generated by said input means at said first time and corrected by said correction means from the signal generated by said input means at said second time and corrected by said correction means to generate a subtracted image signal; and detection means for detecting movement of said moving object in an image area within said field of view, based on the subtracted image signal.

22. The apparatus of claim 21, wherein said input means comprises line input means for generating multilevel signals along each of a plurality of scanning lines, and said detection means comprising comparing means for comparing the multilevel signals with a threshold and generating means for generating a detection signal in response to the comparison made by said comparing means.

23. The apparatus of claim 21, further including localization means for setting the image area to cover the moving image.

24. The apparatus of claim 21, wherein the dimension of the image area is fixed.

25. The apparatus of claim 22, wherein said comparing means compares the multilevel signals with one threshold selected from a plurality of thresholds, each corresponding to a particular line.

26. A method of detecting a moving image corresponding to a moving object within the field of view of a monitoring device, comprising the steps:

generating signals corresponding to a scene, including the moving object, at first and second times;

correcting the signals in accordance with the distance between the moving object and said monitoring device;

subtracting the signal generated by said generating step at said first time and corrected by said correcting step from the signal generated by said generating step at said second time and corrected by said correcting step to generate a subtracted image signal; and detecting movement of said moving object in an image area within said field of view, based on the subtracted image signal.

27. The method of claim 26, wherein said generating step comprises the step of generating multilevel signals along each of a plurality of scanning lines, and said detecting step comprises the step of comparing the multilevel signals with a threshold and generating a detection signal in response to the comparison made by said comparing step.

28. The method of claim 26, wherein the dimension of the image area is fixed.

29. The method of claim 27, wherein said comparing step includes the step of comparing the multilevel signals with one threshold selected form a plurality of thresholds, each corresponding to a particular line.

* * * * *